(12) United States Patent
Wong et al.

(10) Patent No.: US 7,714,842 B2
(45) Date of Patent: May 11, 2010

(54) INTELLIGENT MOUSE

(75) Inventors: Shih-Fang Wong, Guangdong (CN);
Zhi-Yuan Ye, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 678 days.

(21) Appl. No.: 11/619,604

(22) Filed: Jan. 3, 2007

(65) Prior Publication Data

US 2007/0205984 A1    Sep. 6, 2007

(30) Foreign Application Priority Data

Mar. 3, 2006   (CN) .................... 2006 1 0034176

(51) Int. Cl.
*G06F 3/033* (2006.01)
(52) U.S. Cl. ..................... 345/163; 345/156
(58) Field of Classification Search ......... 345/156–179; 340/825.19; 341/20–21
See application file for complete search history.

(56) References Cited

U.S. PATENT DOCUMENTS

| 6,373,472 | B1 * | 4/2002 | Palalau et al. ............... 345/173 |
| 2002/0093485 | A1 * | 7/2002 | Pappas ...................... 345/163 |
| 2004/0135825 | A1 * | 7/2004 | Brosnan ..................... 345/857 |
| 2005/0200603 | A1 * | 9/2005 | Casebolt et al. ............. 345/157 |
| 2006/0007145 | A1 * | 1/2006 | Naghi et al. ................ 345/163 |
| 2006/0098027 | A1 * | 5/2006 | Rice et al. .................. 345/619 |
| 2007/0018952 | A1 * | 1/2007 | Arseneau et al. ............ 345/156 |
| 2007/0075965 | A1 * | 4/2007 | Huppi et al. ................ 345/156 |
| 2007/0132733 | A1 * | 6/2007 | Ram .......................... 345/163 |
| 2007/0279384 | A1 * | 12/2007 | Brosnan ..................... 345/166 |

FOREIGN PATENT DOCUMENTS

| CN | 2629117 Y | 7/2004 |
| CN | 1567168   | 1/2005 |

* cited by examiner

*Primary Examiner*—Nitin Patel
(74) *Attorney, Agent, or Firm*—Winston Hsu

(57) ABSTRACT

The present invention provides an intelligent mouse includes a physical environment conditions detector for sampling physical environment conditions in the intelligent mouse, a physical condition adjustor for adjusting the physical environment conditions; and a microprocessor unit for processing operations of the intelligent mouse. The microprocessor unit comprises a memory for storing a reference physical condition value represented a modest physical condition range; and an environment controller for processing the physical condition values and outputting a controlling command to the physical condition adjustor. The intelligent mouse can measure physical environment conditions automatically and adjust the physical environment conditions into a modest range automatically.

15 Claims, 2 Drawing Sheets

INTELLIGENT MOUSE

BACKGROUND

1. Technical Field

The present invention relates to an input device, particularly to an input device with a function of adjusting its physical conditions.

2. Related Art

Because of bad exterior environments, an ordinary mouse can not supply a modest operation environment for a user. For example, an operating hand is prone to shivers in chilly winter or sweats and becomes moist in hot summer.

The China patent application CN03139617, entitled "a warmer and cooler mouse", published on Jan. 19, 2005, discloses such a mouse can supply a user a warmer temperature in cold environment and a cool temperature in hot environment.

However the present mouse has two disadvantages, firstly, the mouse lacks an automatically adjustment mechanics to control the temperature of the mouse; a user has to turn on or turn off a switch manually. Secondly, the mouse lacks a comprehension of adjusting a physical moistness parameter.

Accordingly, it would be advantageous if the mouse can detect and adjust its physical conditions, not only the physical temperature parameter, but also the physical moistness parameter to a modest one automatically.

SUMMARY

In view of the foregoing disadvantages inherent in the known mouse now present in the prior art, the present invention provides an intelligent mouse make up the shortcomings of present mouse.

To attain this, the present invention generally includes an intelligent mouse includes a physical environment conditions detector for sampling physical environment conditions in the intelligent mouse, a physical condition adjustor for adjusting the physical environment conditions; and a microprocessor unit for processing operations of the intelligent mouse. The microprocessor unit comprises a memory for storing a reference physical condition value represented a modest physical condition range; and an environment controller for processing the physical condition values and outputting a controlling command to the physical condition adjustor.

One object of the present invention is to provide an intelligent mouse can measure the physical environment conditions in the intelligent mouse automatically.

The other object of the present invention is to provide an intelligent mouse can adjust the physical environment conditions to a modest range meeting a comfortable and intelligent life.

DETAILED DESCRIPTION OF THE EMBODIMENTS

The present invention provides an intelligent mouse 1 which samples and adjusts physical conditions of the intelligent mouse 1 automatically.

Figure 1:
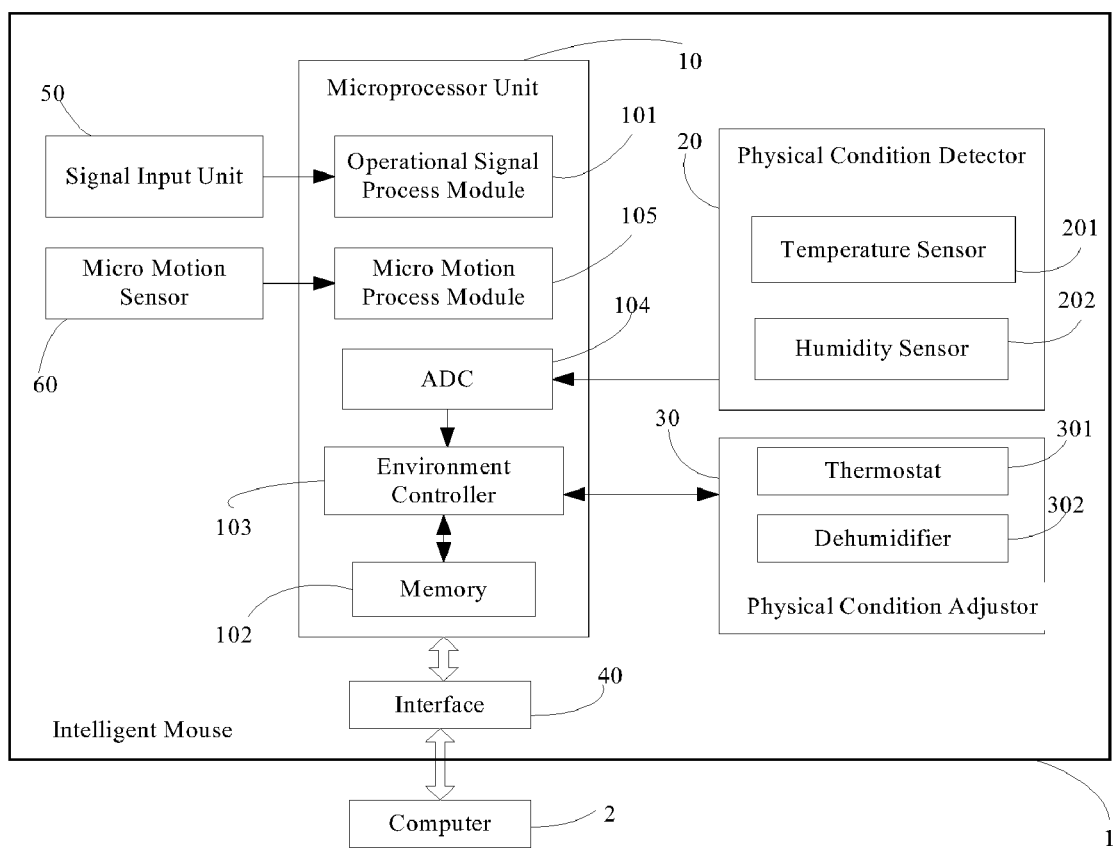
FIG. 1 is a block diagram of an intelligent mouse in accordance with a preferred embodiment of the present invention.

Shown in FIG. 1 is a block diagram of the intelligent mouse 1 in accordance with a preferred embodiment of the present invention. The intelligent mouse 1 obtains power supply from a computer 2 and exchanges data with the computer 2 through an interface 40. The interface 40 is a USB (universal serial bus) port or a PS/2 port.

The intelligent mouse 1 receives operational signals from a signal input unit 50. The signal input unit 50 includes a scroll, a left button, and a right button. The intelligent mouse 1 receives motion signals of the intelligent mouse 1 by a micromotion sensor 60.

The intelligent mouse 1 further includes a physical conditions detector 20 for sampling physical conditions of the intelligent mouse. The physical conditions detector 20 includes temperature sensors 201 and humidity sensors 202. The temperature sensors 201 are configured for measuring a physical temperature thus obtaining a physical temperature parameter. The humidity sensors 202 are configured for measuring a physical moistness thus obtaining a physical moistness parameter. The temperature sensors 201 and the humidity sensors 202 are configured at appropriate positions of the intelligent mouse 1. The appropriate positions are where the sensors can efficiently detect changes of the physical conditions, such as a position near the left button, the right button or a position of where a palm contacts.

The intelligent mouse 1 also includes a microprocessor unit 10 for processing the operational signals. The microprocessor unit 10 includes an operational signal process module 101 and a micro-motion process module 105. The operational signal process module 101 is used to process the signals from the signal input unit 50. The micro-motion module process 105 is used to process the motion signals from the micromotion sensor 60.

The intelligent mouse 1 further includes an analog-to-digital converter (ADC) 104, a memory 102, an environment controller 103, and a physical condition adjustor 30. The ADC 104 is configured for converting the physical conditions (i.e., the physical temperature parameter and the physical moistness parameter) into digitalized physical condition values (i.e., a temperature value and a dampness value).

The memory 102 is configured for storing reference physical condition values (i.e., a critically high temperature value, a critically low temperature value, and a critically wet value). The critically high temperature value and the critically low temperature value define a range of modest physical temperature. The critically wet value defines a critical wetness and suitable moistness. The environment controller 103 is configured for processing the environment values (i.e., the temperature value and the dampness value).

The physical condition adjustor 30 is configured for adjusting physical conditions of the intelligent mouse 1. The physical condition adjustor 30 includes a thermostat 301 and a dehumidifier 302. The thermostat 301 is configured for adjusting the physical temperature of the intelligent mouse 1. The dehumidifier 302 is configured for adjusting the physical moistness of the intelligent mouse 1. The thermostat 30 and the dehumidifier 302 may be a micro-fan, a heater, or a combination of them.

The environment controller 103 compares the temperature value with the critically high temperature value and the critically low temperature value. If the temperature value is between the critically high temperature value and the critically low temperature value, the environment controller 103 inactivates the thermostat 301. If the temperature value is higher than the critically high temperature value or lower than the critically low temperature value, the environment controller 103 activates the thermostat 301. In the preferred embodiment, if the temperature value is higher than the critically high temperature value, the thermostat 301 adopts the micro-fan to cool down the intelligent mouse 1, so as to decrease the physical temperature of the intelligent mouse 1; if the temperature value is lower than the critically low temperature value, the thermostat 301 adopts the heater to warm up the intelligent mouse 1 so as to increase the physical temperature of the intelligent mouse 1.

The environment controller 103 compares the dampness value with the critically wet value. If the dampness value is higher than the critically wet value, the environment controller 103 activates the dehumidifier 302. In the preferred embodiment, if the dampness value is higher than the critically wet value, the dehumidifier 302 activates the micro-fan to dehumidify the intelligent mouse 1, so as to decrease the physical humidity of the intelligent mouse 1; if the dampness value is higher than the critically wet value, and if the temperature value is lower than the critically high temperature value, the dehumidifier 302 further activates the heater to dehumidify the intelligent mouse 1. If the dampness value is lower than the critically wet value, and if the temperature value is between the critically high temperature value and critically low temperature value, the environment controller 103 inactivates the dehumidifier 302 to stop the micro-fan or the heater.

Figure 2:
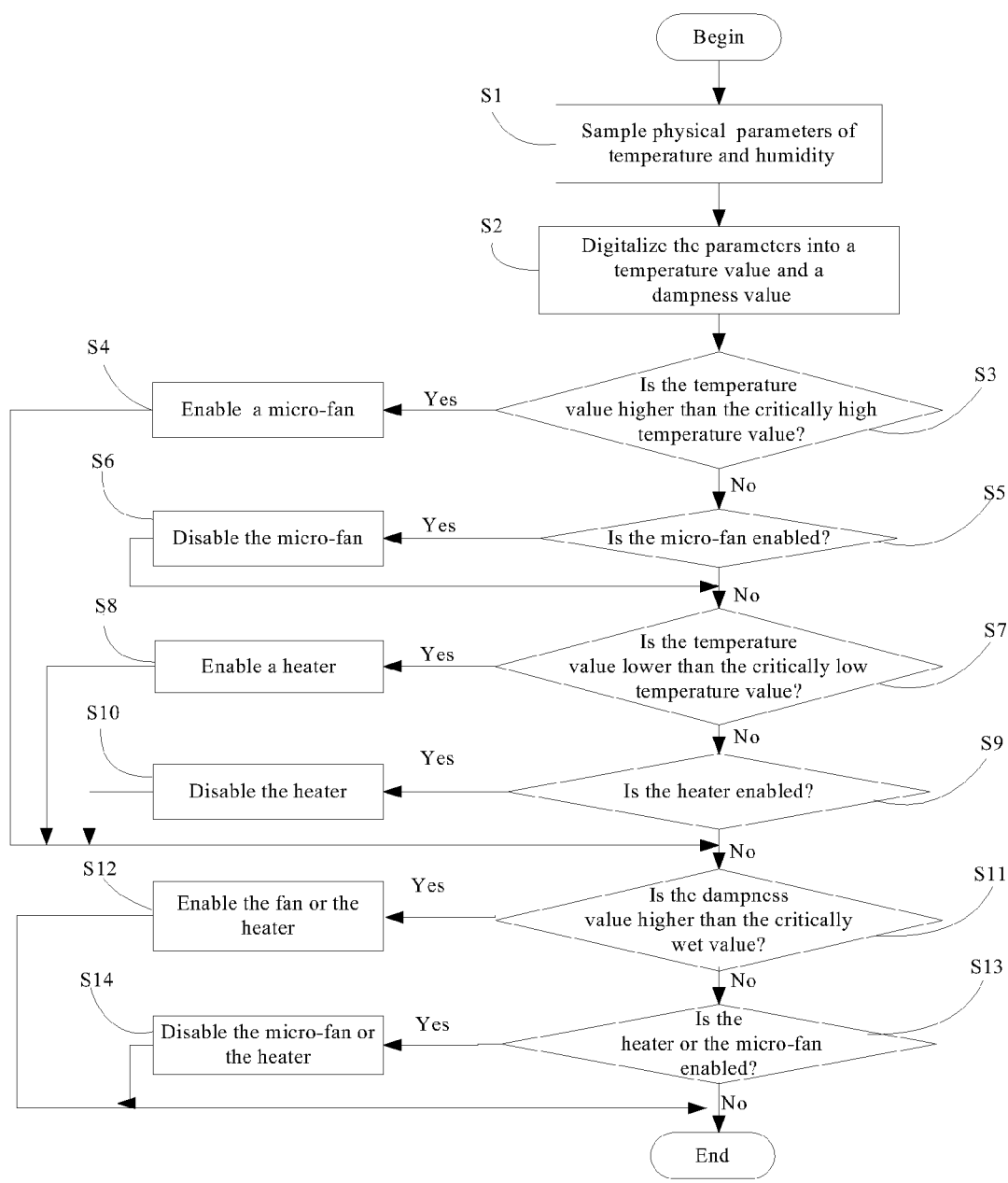
FIG. 2 describes a flow chart of a preferred procedure for presenting an operation process according to the present invention.

FIG. 2 is a flow chart illustrating a preferred procedure for adjusting the physical environment conditions in the intelligent mouse 1.

In step S1, after being powered on, the temperature sensors 201 and the humidity sensors 202 is signaled to sample the temperature and the humidity in the intelligent mouse 1 respectively, thus to obtain the physical temperature parameter and the physical moistness parameter. In step S2, the ADC 104 converts the physical temperature parameter and the physical moistness parameter into the digitalized temperature value and the digitalized dampness value respectively.

In step S3, the environment controller 103 compares the temperature value with the critically high temperature value stored in the memory 102. If the temperature value is higher than the critically high temperature value, in step S4, the environment controller 103 activates the micro-fan to cool down the physical temperature in the intelligent mouse 1, and the procedure goes to step S11. If the temperature value is lower than the critically high temperature value, in step S5, the environment controller 103 detects whether the micro-fan is activated. If the micro-fan is inactivated, the procedure goes to step S7 directly. If the micro-fan is activated, in step S6, the environment controller 103 inactivates the micro-fan, and the procedure goes to step S7.

In the step S7, the environment controller 103 compares the temperature value with the critically low temperature value stored in the memory 102. If the temperature value is lower than the critically low temperature value, in step S8, the environment controller 103 activates the heater to warm up the physical temperature in the intelligent mouse 1, and the procedure goes to step S11. If the temperature value is higher than the critically low temperature value, in step S9, the environment controller 103 detects whether the heater is activated. If the heater is inactivated, the procedure goes to step S11 directly. If the heater is activated, in step S10, the environment controller 103 inactivates the heater, and the procedure goes to step S11.

In step S11, the environment controller 103 compares the dampness value with the critically wet value stored in the memory 102. If the dampness value is higher than the critically wet value, in step S12, the environment controller 103 activates the micro-fan or the heater to dehumidify the intelligent mouse 1, and the procedure is finished. If the dampness value is lower than the critically wet value, in step S13, the environment controller 103 detects whether the micro-fan or the heater is activated. If the micro-fan or the heater is inactivated, the procedure is finished. If the micro-fan or the heater is activated, in step S14, the environment controller 103 inactivates the micro-fan or the heater, and the procedure is finished.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An intelligent mouse comprising:
   an physical environment conditions detector for sampling physical environment conditions in the intelligent mouse;
   an physical condition adjustor for adjusting the physical environment conditions; and
   a microprocessor unit comprising:
   an analog-to-digital converter (ADC) for converting the physical environment conditions into digitalized environment values;
   a memory for storing reference physical condition values represented a modest environment range; and
   an environment controller for processing the physical condition values and outputting a controlling command to the physical condition adjustor.

2. The intelligent mouse according to claim 1, further comprising an interface connected to a computer for obtaining power supply from the computer and exchanging data with the computer.

3. The intelligent mouse according to claim 1, wherein the physical environment conditions detector comprises temperature sensors and humidity sensors, the temperature sensors configured for sampling a physical temperature parameter in the intelligent mouse, and the humidity sensors configured for sampling a physical moistness parameter in the intelligent mouse.

4. The intelligent mouse according to claim 3, wherein the physical environment conditions detector is configured at an appropriate position of the intelligent mouse where is available to detect changes of the environment.

5. The intelligent mouse according to claim 4, wherein the ADC is configured for converting the physical temperature parameter and the physical moistness parameter into a digitalized temperature value and a digitalized dampness value respectively.

6. The intelligent mouse according to claim 5, wherein the reference data comprises a critically high temperature value, a critically low temperature value, and a critically wet value.

7. The intelligent mouse according to claim 6, wherein the physical condition adjustor comprises a thermostat and a dehumidifier, the thermostat configured for adjusting a physical temperature parameter in the intellectual mouse, and the dehumidifier configured for adjusting a physical moistness parameter in the intellectual mouse.

8. The intelligent mouse according to claim 7, wherein the environment controller is configured for comparing the temperature value with the critically high temperature value and the critically low temperature value, and outputting a temperature command to the physical condition adjustor; and the thermostat is configured for adjusting parameter of the physical temperature parameter in the intelligent mouse according to the temperature command.

9. The intelligent mouse according to claim 8, wherein the environment controller is configured for activating the thermostat if the temperature value is higher than the critically high temperature value or lower than the critically low temperature value; otherwise inactivating the thermostat if the temperature value is between the critically high temperature value and the critically low temperature value.

10. The intelligent mouse according to claim 9, wherein the thermostat comprises a micro-fan and a heater.

11. The intelligent mouse according to claim 10, wherein:
the environment controller activates the micro-fan if the temperature value is higher than the critically high temperature value, and inactivates the micro-fan if the temperature value is lower than the critically low temperature value;
the environment controller activates the heater if the temperature value is lower than the critically high temperature value, and inactivates the heater if the temperature value is higher than the critically low temperature value.

12. The intelligent mouse according to claim 7, wherein the environment controller is configured for comparing the dampness value with the critically wet value, and then outputting a humidity command to the dehumidifier; and the physical condition adjustor is configured for adjusting physical moistness parameter in the intelligent mouse according the humidity command.

13. The intelligent mouse according to claim 12, the environment controller is configured for activating the dehumidifier if the dampness value is higher than the critically wet value; or inactivating the dehumidifier if the dampness value is lower than the critically wet value.

14. The intelligent mouse according to claim 13, wherein the dehumidifier comprises a micro-fan and a heater.

15. The intelligent mouse according to claim 14, wherein:
the environment controller activates the micro-fan if the dampness value is higher than the critically wet value and the temperature value is higher than the critically low temperature value;
the environment controller activates the heater if the dampness value is higher than the critically wet value and the temperature value is lower than the critically low temperature value;
the environment controller inactivates the micro-fan if the dampness value is lower than the critically wet value and the temperature is lower than the critically high temperature value;
the environment controller inactivates the heater if the dampness value is lower than the critically wet value as well as the temperature is higher than the low temperature value.

* * * * *